United States Patent [19]
Finney

[11] Patent Number: 4,756,802
[45] Date of Patent: Jul. 12, 1988

[54] SOLAR DISTILLATION DEVICE

[76] Inventor: David S. Finney, 1506 Browning, Arlington, Tex. 76010

[21] Appl. No.: 920,257

[22] Filed: Oct. 16, 1986

Related U.S. Application Data

[63] Continuation-in-part of Ser. No. 672,876, Nov. 19, 1984, abandoned.

[51] Int. Cl.⁴ .............................. B01D 3/02; C02F 1/14
[52] U.S. Cl. ..................................... 202/172; 202/177; 202/185.3; 202/185.4; 202/185.6; 202/190; 202/233; 202/234; 126/440; 159/903; 203/10; 203/22; 203/25; 203/DIG. 1; 203/DIG. 17
[58] Field of Search ...................... 202/234, 233, 185.3, 202/185.1, 190, 185.4, 185.6, 172, 83, 177; 203/DIG. 1, 10, 11, 100, 71, 22, 25, DIG. 17; 126/440, 424, 425, 438, 439; 159/903, 904; 165/122

[56] References Cited

U.S. PATENT DOCUMENTS

| 660,257 | 10/1900 | Lance | 202/185.3 |
|---|---|---|---|
| 2,490,659 | 12/1949 | Snyder | 202/234 |
| 3,015,613 | 1/1962 | Edmondson | 202/234 |
| 3,190,816 | 6/1965 | Ademac | 203/DIG. 1 |
| 3,193,473 | 7/1965 | Beard | 202/234 |
| 3,357,898 | 12/1967 | Novakovich | 202/234 |
| 3,501,381 | 3/1970 | Delano | 202/234 |
| 3,736,234 | 5/1973 | Miyamoto | 202/185.6 |
| 4,075,063 | 2/1978 | Tsay et al. | 202/234 |
| 4,110,172 | 8/1978 | Spears | 202/234 |
| 4,151,046 | 4/1979 | Eidelberg | 203/DIG. 1 |
| 4,194,949 | 3/1980 | Stark | 202/180 |
| 4,204,914 | 5/1980 | Diggs | 203/DIG. 1 |
| 4,209,363 | 6/1980 | Ramer | 203/DIG. 1 |
| 4,327,552 | 5/1982 | Dukess | 203/DIG. 1 |

FOREIGN PATENT DOCUMENTS 908123 10/1962 United Kingdom ............ 202/185.3

Primary Examiner—Wilbur Bascomb
Attorney, Agent, or Firm—H. Dennis Kelly

[57] ABSTRACT

A distillation device for distilling liquids, using concentrated solar energy to evaporate the undistilled liquid. A lens focuses solar rays into a concentrated area on the outer surface of an opaque heat target, the inner surface of which is in contact with the undistilled liquid in a container. The heat target evaporates the liquid, and the steam is condensed within a dome over the container, the dome having a plurality of cooling fins. The dome is cooled by compressed air, which circulates through an air conduit which spirals around the dome from top to bottom. The distilled liquid is conducted through a pipeline through the undistilled liquid in the container, and then out of the container.

6 Claims, 3 Drawing Sheets

SOLAR DISTILLATION DEVICE

CROSS REFERENCE TO RELATED APPLICATION

This application is a continuation-in-part of application Ser. No. 06/672,876, filed Nov. 19, 1984 and now abandoned.

BACKGROUND OF THE INVENTION

1. Field of the Invention

This invention relates in general to distillation devices for distilling liquids, and in particular to distillation devices which use solar energy to distill sea water to fresh water.

2. Description of the Prior Art

As the world's supply of fresh water dwindles, and the demand continues to rise, it is becoming more and more important to find new supplies of fresh water. One promising source of fresh water is the ocean. The salty sea water can be evaporated, and condensed to produce distilled water.

Several distillation devices have been designed to evaporate sea water using solar energy. U.S. Pat. No. 4,292,136 (Clavier) discloses one such device. This device includes two adjacent canals fed with sea water, a greenhouse type structure over one of the canals to vaporize water from it, and a structure for condensation of water. The condensation structure is in communication with the greenhouse structure and is largely immersed in the second canal. The second canal acts as a cold source for the condensing unit.

Prior art solar distillation devices generally consist of greenhouse type structures. Sea water is contained in the structure, which has a roof consisting of some type of light concentrating lens. As sunlight passes through the roof of the greenhouse structure, the light rays are concentrated in the sea water, and the steam rises to the roof of the structure. The steam then contacts some condensing means which condenses the steam to a distilled liquid. Examples of this type of structure may be found in U.S. Pat. No. 4,194,949 (Stark); U.S. Pat. No. 4,270,981 (Stark); and U.S. Pat. No. 4,312,709 (Stark et al.)

SUMMARY OF THE INVENTION

The general object of this invention is to provide an improved distillation device for distilling liquids by using solar energy to heat sea water to evaporation. The distillation device has a container for containing an undistilled liquid, such as sea water. A focusing device, such as a light concentrating lens, focuses solar rays onto the outer surface of a heat target. The heat target is an opaque sheet of thin, black steel. The inner surface of the heat target is in contact with the undistilled liquid. The heat target transforms the solar rays to heat, which transforms the undistilled liquid to steam. The steam is condensed to a distilled liquid, and a conduit conducts the distilled liquid out of the container. The conduit includes a pipeline through the undistilled liquid in the container.

DESCRIPTION OF THE PREFERRED EMBODIMENT

Figure 1:
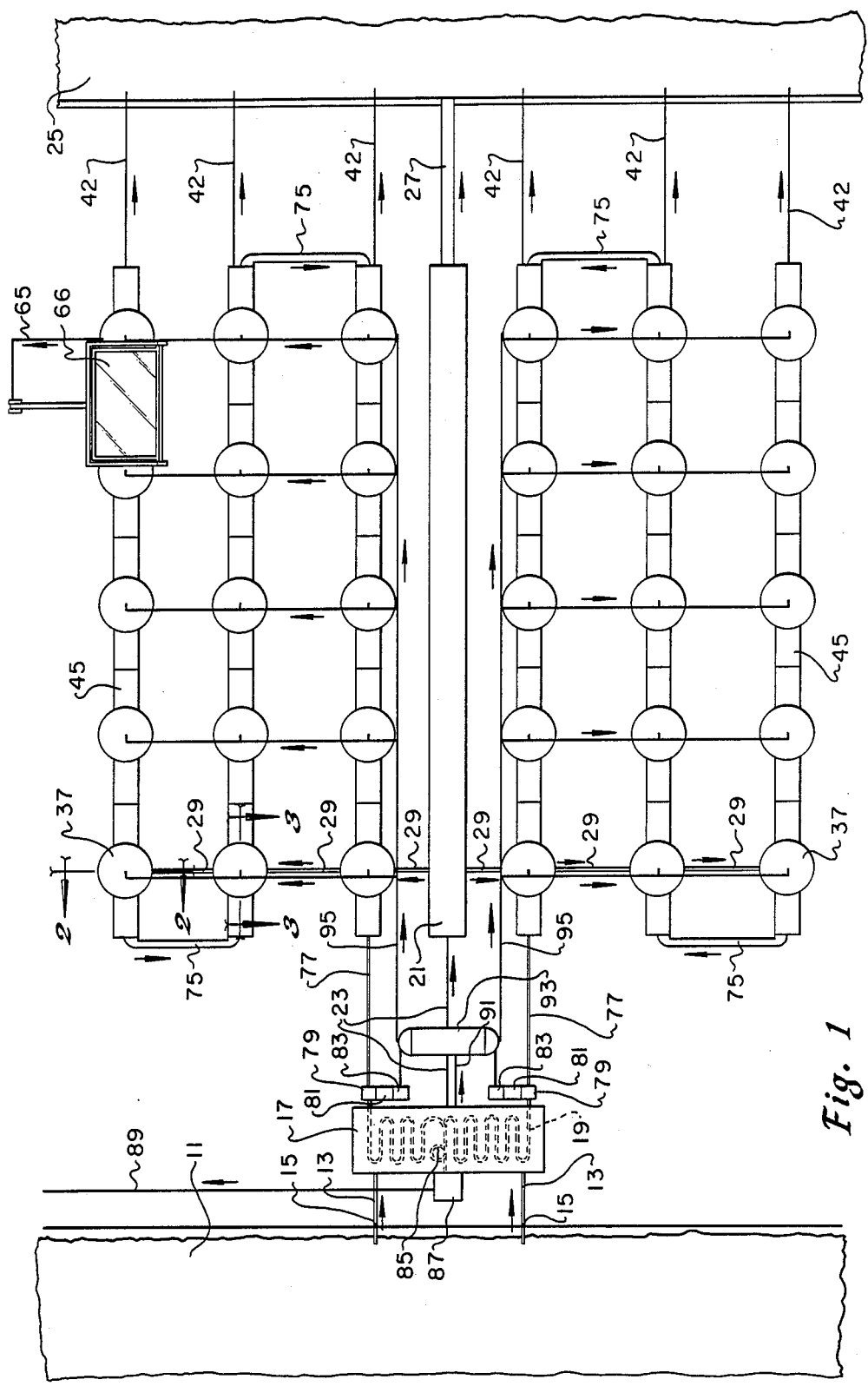
FIG. 1 is a top view of a solar distillation plant section, utilizing a plurality of distillation devices.

FIG. 1 illustrates a section of a solar distillation plant, which utilizes a plurality of distillation devices according to the invention. A sea water inflow ditch 11, which is constructed of black pigmented concrete, supplies the distillation plant with salty sea water from a nearby tidal pond (not shown). The tidal pond captures and holds sea water from an ocean at each high tide.

Sea water from the sea water inflow ditch 11 flows into a pair of sea water inflow pipes 13, which are insulated from the surrounding earth. Gates 15 in the sea water inflow pipes 13 keep the sea water from returning to the sea water inflow ditch 11.

The sea water flows through the sea water inflow pipes 13 into a first heat exchanger 17. Inside this heat exchanger 17, the sea water is heated by contact with pipes 19 which wind through the heat exchanger 17.

The sea water then flows to a second heat exchanger 21 through an insulated sea water inflow line 23. Within this second heat exchanger 21, the sea water flows through pipes (not shown) which wind through the second heat exchanger 21. These pipes are surrounded by heated water from a solar pond 25.

The solar pond 25 is a shallow pond of water having a very high level of salt content. The water in the pond 25 is super-heated by the sun, and then flows through a solar pond connect channel 27 to the second heat exchanger 21.

The super-heated water from the solar pond 25 surrounds the pipes in the second heat exchanger 21, and heats the sea water within the pipes to a high temperature. The sea water then flows through a pair of sea water inflow pipes 29 in opposite directions away from the second heat exchanger 21.

A typical distillation plant section, such as is shown in FIG. 1, may have about fifteen distillation devices 37 on each side of the second heat exchanger 21, for a total of about thirty distillation devices 37. These distillation devices 37 may be arranged in rows of five distillation devices 37.

Figure 2:
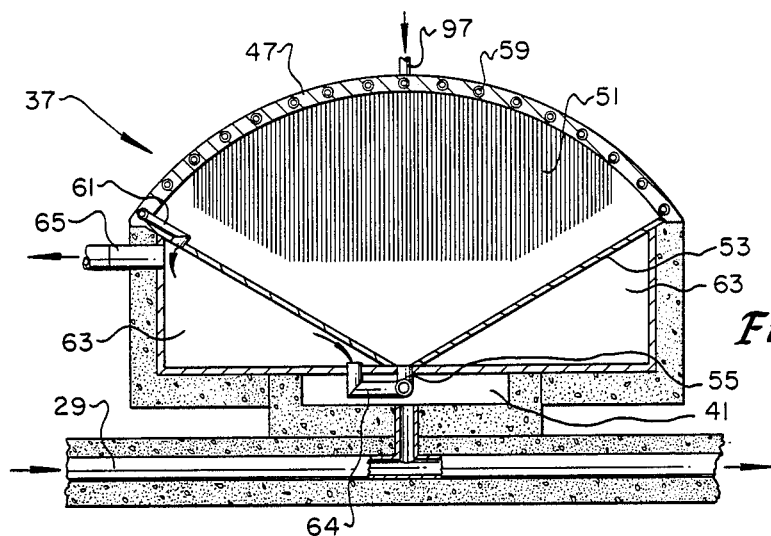
FIG. 2 is a sectional view of one of the distillation devices, as seen along line 2—2 in FIG. 1.
Figure 3:
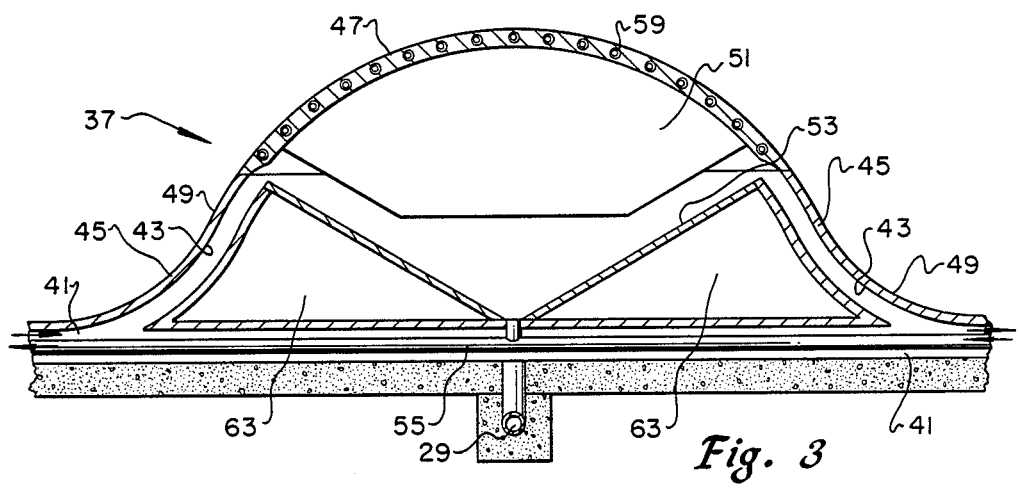
FIG. 3 is a sectional view of one of the distillation devices, as seen along line 3—3 in FIG. 1.

FIGS. 2 and 3 show one of the distillation devices 37 in greater detail. Sea water, from one of the sea water inflow lines 29, flows into sea water holding troughs 41, which flow beneath each row of distillation devices 37.

Each sea water holding trough 41 extends down each row of distillation devices 37. At the far end of each row, the sea water, which then has a high concentration of salt, enters a waste line 42, as shown in FIG. 1, and empties into the solar pond 25.

Some of the sea water in the sea water holding trough 41 flows into the distillation device 37, which is a container for containing the undistilled liquid. The sea water within the distillation device 37 rises within the distillation device 37 to a level even with the level of the water in the first heat exchanger 17.

The undistilled sea water within the distillation device 37 contacts the inner surfaces 43 of a pair of heat targets 45. Each heat target 45 is a very thin, black, opaque piece of steel, which curves downward from a pressure dome 47. Each heat target 45 then extends horizontally to abut a heat target 45 in the next distillation device 37 in the row, as shown in FIG. 1.

Solar rays are concentrated on the outer surfaces 49 of the heat targets 45. The heat targets 45 transform the solar rays to heat, which is conducted through the heat targets 45 to the undistilled water within the distillation device 37. The water in contact with the inner surface 43 of the heat target 45 is evaporated.

As the water evaporates, the steam rises within the pressure dome 47. Condensation means, such as a plurality of cooling fins 51, is located on the inner surface of the pressure dome 47, for condensing the steam to a distilled liquid. Upon contact with cooling fins 51 on the pressure dome 47 of the distillation device 37, the steam cools, and condenses to a distilled liquid.

The condensed distilled liquid drips down onto a fresh water collection bowl 53 and flows to the center of the distillation device 37. The distilled water then exits the distillation device 37 through a fresh water outflow pipe 55, which is a conduit means for conducting the distilled water out of the distillation device 37.

The fresh water outflow pipe 55 then travels through the sea water holding trough 41 to the next distillation device 37 in the row. When the fresh water outflow pipe 55 has reached the distillation device 37 at the end of the row, the fresh water outflow pipe 55 passes to the next row of distillation devices 37.

Figure 4:
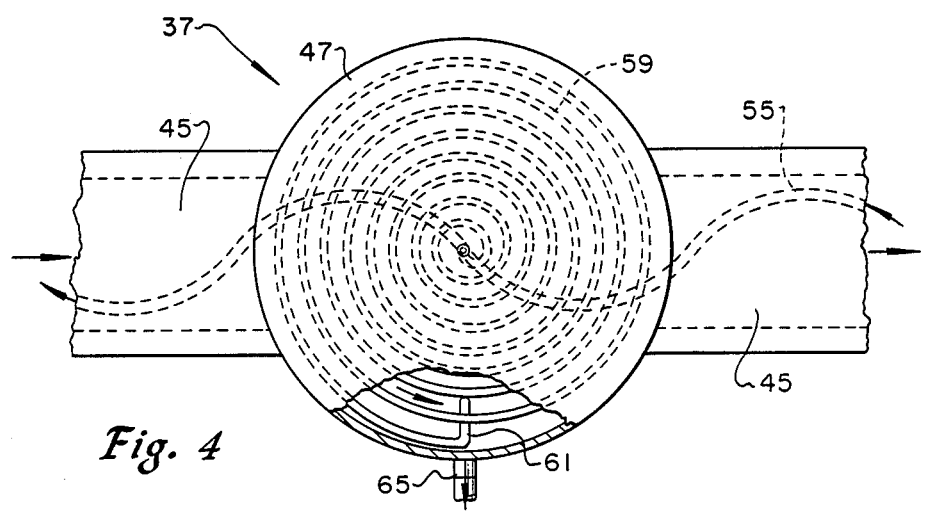
FIG. 4 is a top view, partially in section, of one of the distillation devices.

As shown in FIG. 4, the fresh water outflow pipe 55 is serpentine as it passes through the sea water holding trough 41. This shape provides additional surface area on the fresh water outflow pipe 55, so that the heat from the distilled liquid can be transferred to the undistilled water in the sea water holding trough 41.

The pressure domes 47 of the distillation devices 37 are cooled by cooling means which passes compressed air through an air conduit 59. As shown in FIG. 4, the air conduit 59 spirals downward from the top of the pressure dome 47. The air conduit 59 then exits through an exit line 61, and passes into a compressed air storage tank 63. The air storage tank 63 is located within the distillation device 37, below the fresh water collection bowl 53. From the air storage tank 63, the compressed air can be released into the fresh water outflow pipe 55 through an air line 64 or into an air output line 65.

Figure 5:
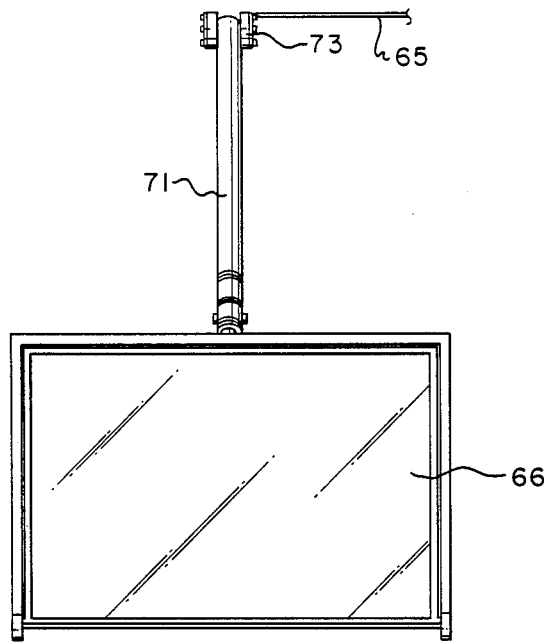
FIG. 5 is a top view of a light concentrating lens and a lens carrier.
Figure 6:
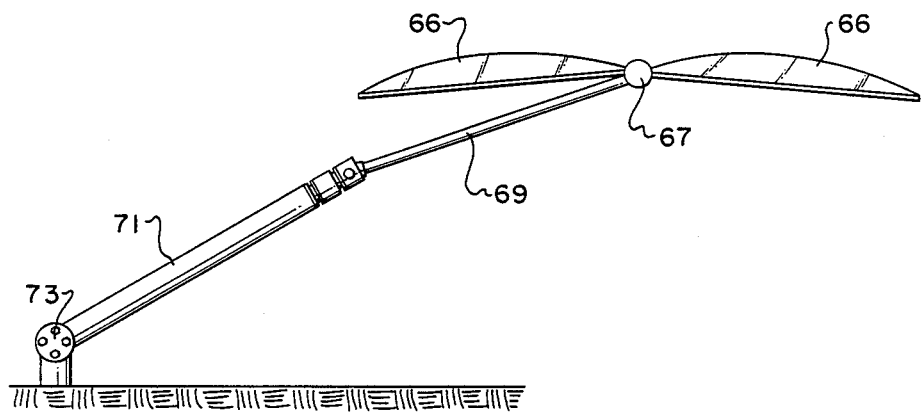
FIG. 6 is a side view of the lens and the lens carrier shown in FIG. 5.

FIGS. 5 and 6 illustrate the focus means for focusing solar rays onto the outer surface 49 of the heat targets 45. The focus means includes a pair of convex lenses 66, which are pivotable about a support 67. The support 67 is mounted on the end of a secondary boom 69, which in turn extends from a primary boom 71.

The primary boom 71 is telescopically extendable, and is pivotable about a stationary support 73. The secondary boom 69 is pivotable about its connection 74 with the primary boom 71. The booms 69, 71 can thus position the lenses 66 to focus sun rays on the heat targets 45.

The booms 69, 71 are extended, retracted, and pivoted by compressed air from the air output line 65. The air output line 65 also supplies compressed air to pivot the lenses 66 about the support 67.

FIG. 1 shows only one of the lenses 66. Preferably, there would be six lenses 66 for each row of five distillation devices 37. Each lens 66, except for the lens 66 on each end, would extend over two heat targets 45. In this manner, the lenses 66 can be rotated to focus solar rays onto each heat target 45, regardless of the position of the sun.

The fresh water outflow pipe 55 passes through each distillation device 37 until it reaches the last distillation device 37 in each row. Then, the fresh water outflow pipe 55 passes through a connecting line 75 to the distillation device 37 on the end of the next row.

When the fresh water outflow pipe 55 has reached the last distillation device 37, the fresh water enters a fresh water outflow pipe 77. This outflow pipe 77 extends through a turbine 79 to the pipes 19 within the first heat exchanger 17. A generator 81 and an air compressor 83 a connected to the turbine 79.

The pipes 19 within the first heat exchanger 17 lead to a cyclone 85, where air in the pipes 19 is separated from the fresh water in the pipes 19. The water flows through a pump house 87 to a fresh water outflow line 89. The pump house 87 houses a turbine and a pump. The turbine may be pneumatic and may be used to run the pump.

The pneumatic turbine is run by some of the air which is removed from the pipes 19 by the cyclone 85. The remainder of the air is directed through an air line 91 to an air storage tank 93. From the air storage tank 93, the compressed air may flow through air lines 95 and air inlets 97 to each of the distillation devices 37.

In operation, the solar distillation plant section, illustrated in FIG. 1, takes undistilled sea water from a sea water ditch 11. The water flows through the sea water inflow pipes 13 to the first heat exchanger 17. There, the sea water is heated by the pipes 19.

The sea water then flows through the sea water inflow line 23, under the air storage tank 93, to the second heat exchanger 21. The sea water flows through pipes which wind through the second heat exchanger 21. The sea water within the pipes absorbs heat from the water in the heat exchanger 21. That water comes from the solar pond 25 through the solar pond channel 27.

The heated sea water then flows through the sea water inflow pipe 29 to the sea water holding troughs 41. The sea water flows down each row of distillation devices 37 and enter each device 37. Waste sea water can be dumped through the waste line 42 into the solar pond 25.

The lenses 66 are angled to focus solar rays onto the heat targets 45. The rays are transformed into heat, to heat the sea water to evaporation.

The steam rises in the pressure dome 47 until it reaches the cooling fins 51. The steam condenses on the cooling fins 51 and drips down into the fresh water collection bowl 53.

The cooling fins 51 are cooled by air passing through the pressure dome 47. The air passes through an air conduit 59, which spirals down from the top of the dome 47. When the air reaches the bottom of the dome 47, the air goes through an exit line 61 into an air storage tank 63.

When a predetermined amount of fresh water has accumulated in the fresh water collection bowl 53, the water is automatically released in the fresh water output pipe 55. Also, hot air from the air storage tank 63 can be injected in to the fresh water output pipe 55, in order to propel the water through the pipe 55.

The fresh water outflow pipe 55 travels through the sea water holding trough 41 to the end of the row of distillation devices 37. The pipe 55 then travels through the connecting line 75 to the next row. At the end of the last row, the air and water in the pipe 55 exits into the fresh water outflow pipe 77.

The outflow pipe 77 carries the air and water through the turbine 79 and into the first heat exchanger 17. The turbine 79 is used to power the generator 81 and the air compressor 83.

The air compressor 83 fills the air storage tank 93. Air from the tank 93 flows through air lines 95 to the top of each of the pressure domes 47.

The water and air in the first heat exchanger 17 are separated by a cyclone 85. The water exits through the pump house 87 to the fresh water outflow line 89. The air exits through the air line 91 to the air storage tank 93.

The invention has been shown in only one of its forms. It should be apparent to those skilled in the art that it is not so limited, but is susceptible to various changes and modifications without departing from the spirit thereof.

I claim:

1. A distillation plant for distilling liquids, the distillation plant comprising:
    a plurality of containers, arranged in rows, for containing an undistilled liquid;
    a plurality of opaque heat targets, each heat target having an inner surface and an outer surface, the inner surface being in contact with the undistilled liquid in one of the containers, wherein each heat target curves downward and outward from a container, and wherein heat targets on adjacent containers abut one another;
    focus means for focusing solar rays onto the outer surface of the heat targets, wherein the heat targets transform the solar rays to heat, to evaporate the undistilled liquid to steam;
    condensation means for condensing the steam to a distilled liquid; and
    conduit means for conducting the distilled liquid away from the condensation means, the conduit means including a pipeline through the undistilled liquid in at least one of the containers.

2. A distillation plant as recited in claim 1, wherein the condensation means is a plurality of opaque domes over the containers.

3. A distillation plant as recited in claim 2, wherein each dome has a plurality of fins for increasing the interior surface area of the dome.

4. A distillation plant as recited in claim 2, further comprising cooling means for cooling the domes.

5. A distillation plant as recited in claim 4, wherein the cooling means is an air conduit for circulating compressed air through the domes.

6. A distillation plant as recited in claim 5, wherein the air conduit is a hemispherical spiral from the top of each dome to the bottom of each dome.

* * * * *